March 27, 1951  E. G. BOICE  2,546,295
TOOL JOINT WEAR COLLAR
Filed Feb. 8, 1946
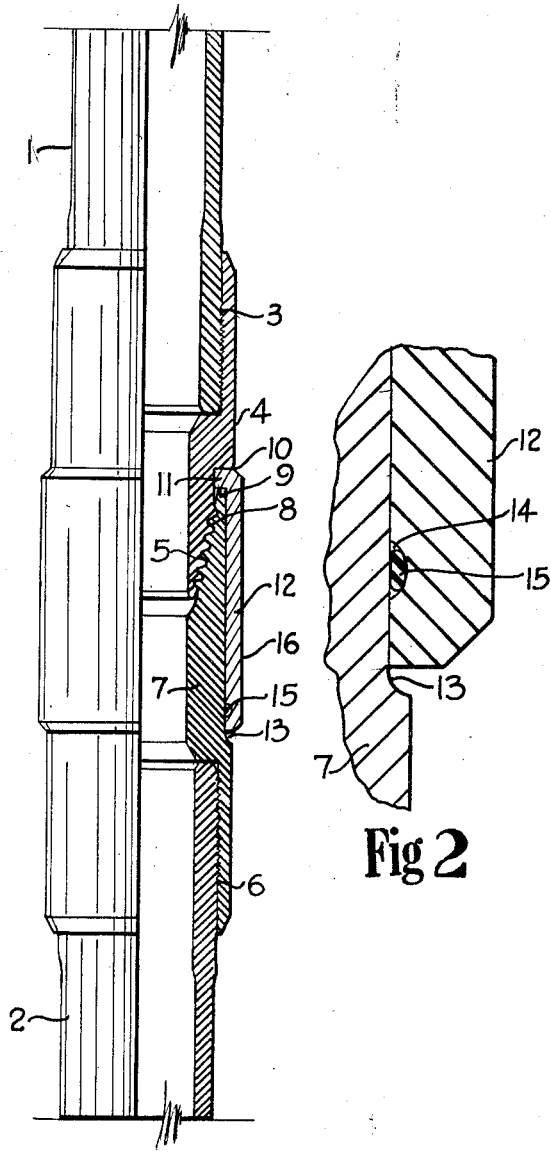
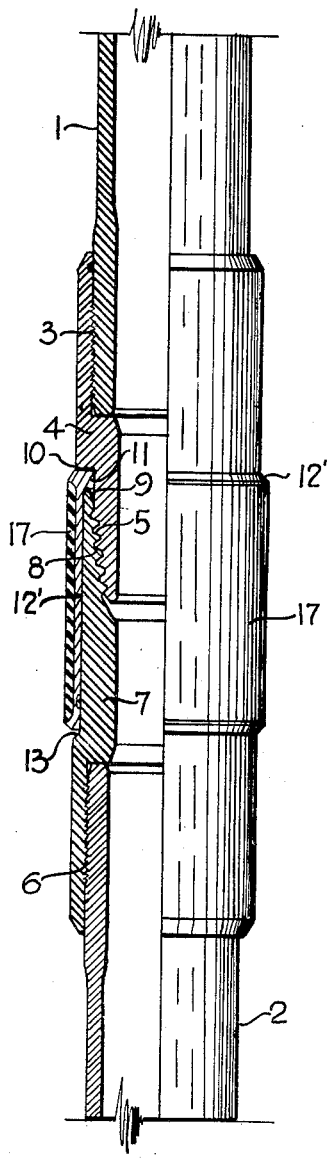
Fig 1  Fig 2  Fig 3
ELVIN G. BOICE
INVENTOR.
BY J. Vincent Martin
Ralph R. Browning
James B. Simms
ATTORNEYS Patented Mar. 27, 1951

2,546,295

UNITED STATES PATENT OFFICE 2,546,295

TOOL JOINT WEAR COLLAR

Elvin G. Boice, Houston, Tex., assignor to Reed Roller Bit Company, Houston, Tex., a corporation of Texas Application February 8, 1946, Serial No. 646,458

2 Claims. (Cl. 308—4)

This invention relates to tool joints and refers more particularly to interchangeable wear collars or sleeves for tool joints which may be readily shifted from one position to another in a drill stem.

Wear collars for tool joints have been used heretofore and in some instances were adapted to be assembled in one position within a drill stem and transferred or shifted to another drill stem position. However, in the conventional sleeves of this type, no provision has been made to resist accidental displacement of the wear collar from the coupling member with which it is associated when the joint is dismantled. For this reason, when the drill stem is withdrawn from the well bore, the collars, if left in association with one of the couplings as the stem is dismantled, are subject to accidental displacement therefrom. Obviously displacement of the wear collar from the stacked stem sections might result in bodily injury or property damage. In addition, when the wear collars are loosely associated with one of the coupling members of a dismantled tool joint, the assembly of the joint might in some instances prove troublesome.

An object of this invention is to provide a wear collar for protection of a tool joint which may be readily shifted from one position in a drill stem to another but which is not likely to be accidentally displaced from the coupling member with which it is associated when the tool joint is dismantled.

Another object is to provide an interchangeable wear collar with means to resist accidental displacement from a dismantled tool joint coupling member.

A further object is to provide a tool joint having an interchangeable wear collar in which a ring of resilient material is carried by the wear collar to frictionally engage one of the coupling members of the tool joint whereby accidental displacement of the wear collar from the latter coupling member is resisted.

Other and further objects of this invention will appear from the following description.

In the accompanying drawing, which forms a part of the instant specification and is to be read in conjunction therewith, and wherein like reference numerals are used to indicate like parts in the various views, Fig. 1 is a fragmentary elevational view partly in section of a well tool having a wear protected joint in accordance with the present invention, Fig. 2 is an enlarged detailed sectional view of a portion of the structure of Fig. 1, and Fig. 3 is a view similar to that of Fig. 1, showing a wear sleeve having a modified wear resisting external surface.

Referring to the drawing, the device comprises upper and lower tubular sections 1 and 2. Section 1 is externally threaded and has screwed thereon an internally threaded portion 3 of a male coupling member 4. This coupling member has an externally threaded tapered end or pin 5. Lower section 2 has external threads to receive the internally threaded portion 6 of a female coupling member 7. The other end of the coupling member 7 has an internally threaded tapered socket or box adapted to receive the externally threaded portion or pin of coupling member 4.

The relatively large threads 5 and 8 may obviously be readily unthreaded without loosening the threaded connections between the coupling members and the tubes 1 and 2.

With the tapered ends of the coupling members tightly assembled the extreme end face 9 of the member 7 is spaced from the shoulder 10 of the member 4. This provides flat axially spaced abutment between which the inner flange 11 of a wear sleeve or collar 12 is tightly held. The snug fitting flat surfaces provide a seal. Coupling member 7 has a portion 13 of slightly reduced diameter to receive the sleeve 12. An internal circumferential groove 14 adjacent the lower end of sleeve 12 is adapted to receive a rubber seal ring 15. This ring may be made of any suitable material but is preferably rubber, synthetic rubber or the like, and should be of a type resistant to oil. With the sleeve 12 assembled on the coupling member 7 slight axial movement of the sleeve compresses the sealing ring 15. The shape of the ring and groove 14 frictionally secures the sleeve against further axial movement. This facilitates assembly and dismantling of the joint as the collar is firmly but removably mounted on the box 7. This engagement is such as to resist accidental displacement of the collar from the box when the pipe sections are stacked on the derrick floor. In addition, this construction provides a seal which prevents accumulative of abrasive matter between the sleeve and coupling member.

It is contemplated that the outer surface of the wear sleeve of collar 12 may be heat treated or otherwise coated with relatively hard wear resisting materials. A tungsten carbide coating 16 has been found to be very effective in the embodiment of the invention illustrated in Fig. 1. The tungsten carbide coating is particularly adaptable for work below the end of the casing where the sleeve is subject to contact with the surrounding earth formations, but is not desirable for use on tool joints operating within the casing because of the abrasive action of the collar on the casing.

In the modification of Fig. 3 the wear sleeve is coated with rubber or rubber like material. Most of the parts of Fig. 3 are identical with those of Fig. 1. Similar parts have been indicated in the drawing by the prime character reference. The wear sleeve 12' has a recess or groove in its outer surface to which is joined a body or web of rubber 17 which may be molded or vulcanized in place. This type collar is especially adaptable for use within the casing.

In operation the drill stem is assembled in more or less conventional manner, an additional length or section of pipe being added when permitted by the depth of the well bore. As each pipe section is added to the drill stem the tool joint of this invention is employed. The wear collar 12 is placed over the box 7 of the joint and forced to the position in which a flange 11 of the collar rests on the face 9 of the box. When in this position the ring 15 is in frictional engagement between the groove 14 and the outer surface of the box. Thus, while the collar may at any time be removed from the box by use of the customary tools associated with the drilling rig, nevertheless there is little likelihood of accidental displacement of the collar. In addition the assembly of the tool joint is facilitated by the tight fit of the collar on the box.

As the drilling progresses the operator is careful to shift the collars into various positions throughout the drill stem so that the collars protecting the joints which will operate beneath the lower extremity of the casing will have a hard outer surface such as that shown in Fig. 1. On the other hand the joints operating within the well casing are preferably protected by wear collars as shown in Fig. 3.

It is contemplated that standard or conventional coupling members may be modified for use in accordance with this invention. This modification is accomplished by slightly reducing the outer diameter of the portion of the box 7 so that the wear collar can be inserted thereon. Also, it is necessary to cut off the end of the box member an amount equivalent to the thickness of the flange 11 of the wear collar. These modifications are simple and may be readily made. However, it is contemplated that the box member may be manufactured directly so that it is adaptable for use in accordance with this invention. It is to be noted that in modifying the box the tapered threads of the member are not in any way disturbed and the full thread length remains intact.

It will be seen that the objects of the invention have been accomplished. There has been provided a wear sleeve or collar for protecting tool joints which, in operation may be readily transferred from one joint to another throughout the drill stem, and which may be positively and removably associated with one of the coupling members of the joint. The arrangement is such that a seal is formed between the coupling members and the wear collar flange when the joint is assembled. The construction is such that standard box of a tool joint may be readily modified for use in this invention.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having described my invention, I claim:

1. A tool joint comprising coupling members having opposed shoulders in the connection therebetween, a wear collar slidable over the exterior surface of one of the members and having an annular inturned flange at one extremity thereof with said flange being engageable between the opposed shoulders of the coupling members when the latter are assembled together, said collar encasing a substantial portion of the member upon which it is mounted whereby that end of the collar remote from the flange is spaced a substantial distance from the flange, and a resilient retaining element carried by the wear collar adjacent the end of said collar spaced from the flange and adapted to frictionally engage the exterior of the coupling member which the collar encircles to frictionally retain the wear collar in position on said member.

2. A tool joint as set forth in claim 1 wherein the resilient element is a ring of flowable material and also wherein the ring is confined within an annular groove formed in the wall of the bore of the wear collar at that end of the collar remote from the flange.

ELVIN G. BOICE.

REFERENCES CITED

The following references are of record in the file of this patent:

UNITED STATES PATENTS

| Number | Name | Date |
|---|---|---|
| 1,518,960 | Bowser | Dec. 9, 1924 |
| 2,320,107 | Speckert | May 25, 1943 |